May 2, 1961  J. R. HOLLINS  2,982,823
LIGHTING AND SIGNALLING SYSTEMS FOR AUTOMOTIVE VEHICLES
Filed Feb. 21, 1957  4 Sheets-Sheet 1
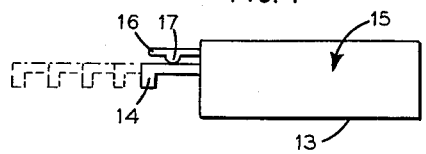
FIG. 1
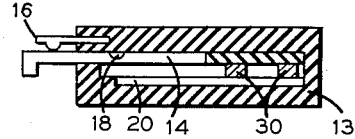
FIG. 2
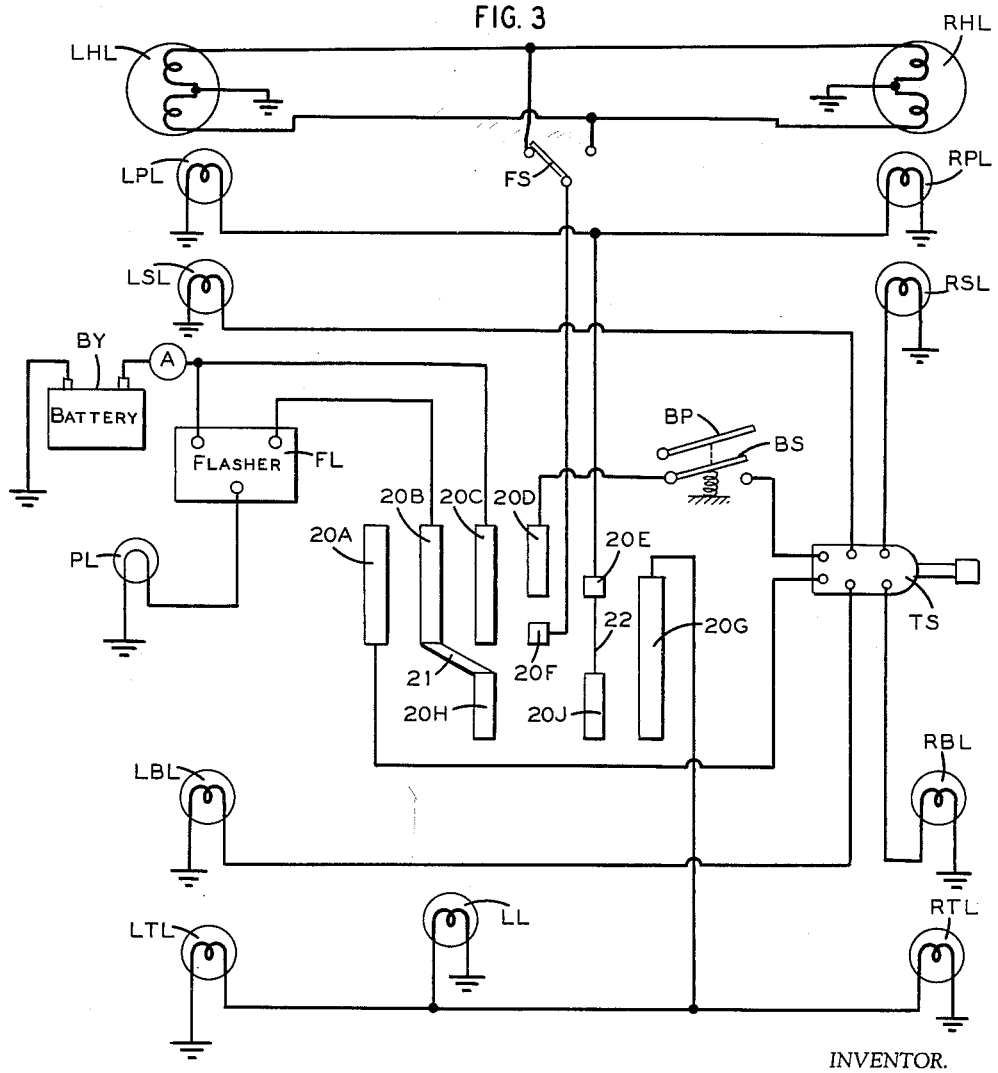
FIG. 3
INVENTOR.
Jesse R. Hollins
BY
ATTORNEY May 2, 1961  J. R. HOLLINS  2,982,823
LIGHTING AND SIGNALLING SYSTEMS FOR AUTOMOTIVE VEHICLES
Filed Feb. 21, 1957  4 Sheets-Sheet 2

INVENTOR.
Jesse R. Hollins
BY

ATTORNEY

May 2, 1961 J. R. HOLLINS 2,982,823
LIGHTING AND SIGNALLING SYSTEMS FOR AUTOMOTIVE VEHICLES
Filed Feb. 21, 1957 4 Sheets-Sheet 3

INVENTOR.
Jesse R. Hollins
BY
ATTORNEY

May 2, 1961 J. R. HOLLINS 2,982,823
LIGHTING AND SIGNALLING SYSTEMS FOR AUTOMOTIVE VEHICLES
Filed Feb. 21, 1957 4 Sheets-Sheet 4
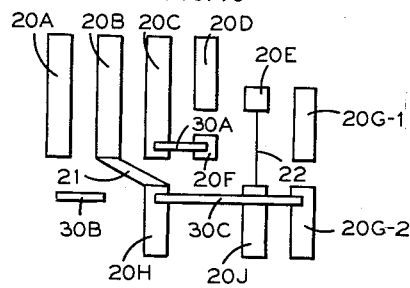
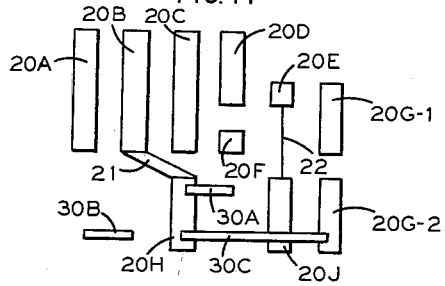
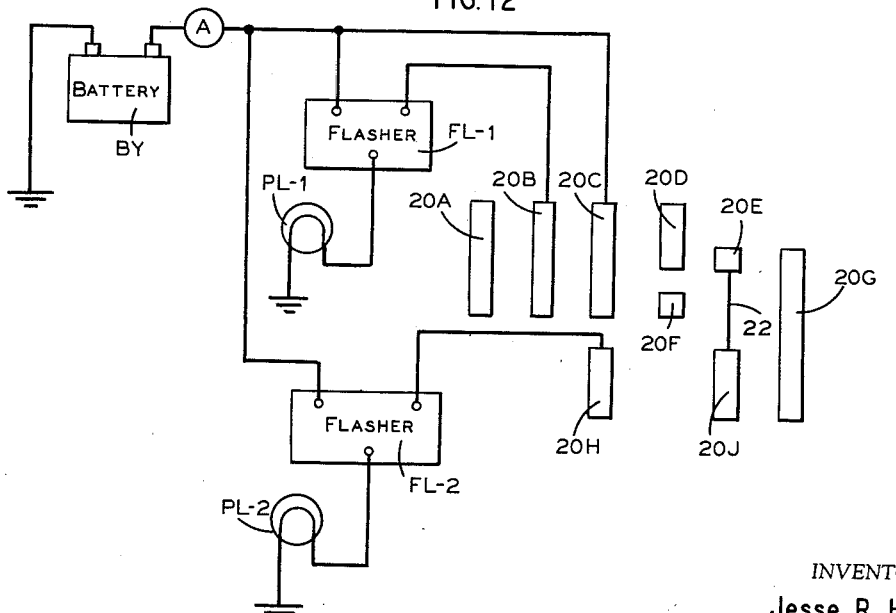
INVENTOR.
Jesse R. Hollins
BY
ATTORNEY

United States Patent Office 2,982,823
Patented May 2, 1961

2,982,823

LIGHTING AND SIGNALLING SYSTEMS FOR AUTOMOTIVE VEHICLES

Jesse R. Hollins, Brooklyn, N.Y., assignor, by mesne assignments, to Abraham Hollins and Jesse R. Hollins, Brooklyn, Lewis S. Hollins, Great Neck, and Theodore D. Davidson, New York, N.Y.

Filed Feb. 21, 1957, Ser. No. 641,742

4 Claims. (Cl. 200—16)

This invention relates to lighting and signalling systems for automotive vehicles and, more particularly, to a novel combined headlamp and emergency signal control switch and system.

Modern automotive vehicles are equipped with a two-position headlamp control switch, for controlling the usual front and rear mounted driving lamps, and usually with separate switch means for controlling turn direction signalling lamps. In one "on" position of the headlamp control switch, the tail lamps, license plate lamp or lamps, and the front mounted parking lamps are illuminated. In the other "on" position, the parking lamps are extinguished and the head lamps are illuminated.

A direction signal control switch is generally provided for selectively flashing left and right mounted lamps to signal a proposed turn. The directional signal lamps may be units separate from the parking and tail or stop lamps or may be mounted in the same lamp compartments with the latter. In some cases, dual filament lamps are provided, with one filament, usually the brighter, providing the directional signal and the other the steady-burning driving lamp.

In prior applications and patents, I have disclosed novel "flare" switch arrangements whereby signal lamps on a vehicle may be simultaneously flashed, in synchronism or in alternation, to give warning of an emergency stopping or parking of the vehicle. Such arrangements have usually been incorporated in, or wired in combination with, the direction signalling switch.

In my copending application, Serial No. 381,163, filed September 21, 1953, now Patent No. 2,787,779, issued April 2, 1957, I have disclosed a novel "flare" or emergency signalling arrangement wherein the "flare switch" is incorporated with the headlamp control switch in a single unit arrangement. The usual two "on" position headlamp control switch is replaced by a control switch having a "neutral" or "off" position on four "on" positions.

The two positions to one side of "neutral" provide the usual headlamp circuit connections, one being the "parking lamp" position and the other the "headlamp" position. In the first position to the other side of "neutral," all the signal lamps are flashed and the license plate lamp means is steadily illuminated. In the second "flare" position, the same occurs but the headlamps are also illuminated to provide light for tire changing, emergency repairs, etc. The flasher for the "flare" position is connected to the normally live contact of the ignition switch, so that the "flare" signals are operative when the ignition switch is open. Also, a separate connection is made to the ammeter or the normally open contact of the ignition switch for steadily illuminating the license plate lamp in both "flare" positions and the headlamps in one "flare" position.

The switch and circuitry of my copending application utilizes the relatively high powered turn signal lamps of the vehicle as "flare" signals. These lamps have relatively high amperage ratings and thus draw current from the battery at a high rate. In the normal operation of these lamps as turn signals, the relatively heavy current drain is of no consequence as the lamps are used for only a short time when signally a turn, and usually considerable time elapses before another turn is signalled.

When the turn signal lamps are used as "flare" signals, they give satisfactory performance and provide warning signals visible for a relatively long distance. However, when a "flare" signal is set up, it may have to be continued for a relatively long time as compared to the relatively short time of a turn signal. Under "flare" conditions, therefore, the total current drain on the battery becomes an important consideration, particularly as the vehicle engine may not be running so that no current is being delivered to the battery by the generator.

In accordance with the present invention, the current drain on the battery during "flare" signaling is substantially reduced by utilizing the parking and tail lamps as "flare" signals. Alternatively, the brake or stop lamps may be used in place of the tail lamps. The parking and tail lamps have amperage ratings substantially less than that of the turn signal lamps, and the brake or stop lamps, while having a higher amperage rating than the tail lamps, usually have a rating less than that of the turn signal lamps. This lower amperage rating results in less current drain on the battery during "flare" or emergency signaling.

A combined headlamp and flare signal switch is used, as in my copending application, and has two "flare" positions in addition to the neutral, parking lamps "on," and headlamps "on" position. In either "flare" position of the switch, the parking, tail, and/or stop lamps are cut out of their usual control circuits, involving the three "normal" positions of the head lamp switch and are brought into "flare" operation. In one "flare" position, the headlamps are "on" and in the other they are "off." In both "flare" positions, the turn signal lamps are cut out of "normal" operation.

For an understanding of the invention principles, reference is made to the following descriptions of typical embodiments thereof as illustrated in the accompanying drawings. In the drawings:

Fig. 1 is a side elevation view of a combined headlamp and "flare" signal switch embodying the invention;

Fig. 2 is a central vertical sectional view of the switch;

Fig. 3 is a schematic wiring diagram illustrating the switch contact arrangement and wiring utilizing the tail lamps as "flare" signals;

Figs. 10 and 11 illustrate the internal connections of the switch of Fig. 9 in each of its "flare" positions; and Fig. 12 illustrates the switch as connected to separate flashers for turn signalling and "flare" signalling respectively.

Figure 4:
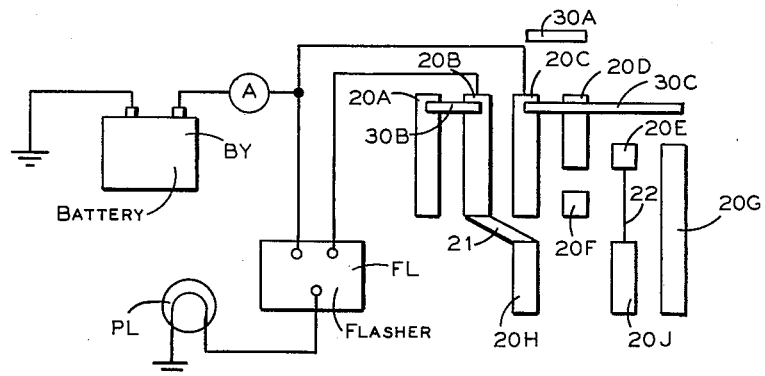
Figs. 4–8 illustrate the internal connections of the switch of Fig. 3 in each of its five positions.

Referring to Figs. 1 and 2, a combined headlamp, or light control, and "flare" signal switch 15 is illustrated, which switch may be substituted for the usual headlamp control switch. Switch 15 comprises a dielectric body 13 and a pull slide 14 having five positions including "off," "parking lamps on," "headlamps on," and two "flare" positions. A latch spring 15 has a dimple 17 engageable in a recess 18 in slide 14 in the "headlamps on," or third, position of slide 14 to serve as a "catch" preventing inadvertent movement of slide 14 to the flare positions.

Body 13 has embedded therein a plurality of contact strips 20 connected to the various lamps of the vehicle, the vehicle battery, one or two flashers, the brake switch, and the turn signal switch. Contacts 20 are selectively bridged by circuit closer strips 30, carried by slide 14, in each of the five switch positions.

Referring to Fig. 3, contact 20A is connected to the turn signal switch TS, contact 20B is connected to flasher FL, contact 20C is connected to ammeter A, contact 20D is connected to brake switch BS operated by brake pedal BP, contact 20E is connected to parking lamps LPL and RPL, contact 20F is connected to foot switch FS connected to headlamps LHL and RHL, contact 20G is connected to tail lamps LTL and RTL and to license plate lamp LL, contact 20H is connected to contact 20B by a bridge 21, and contact 20J is connected to contact 20E by a conductor 22.

The usual grounded vehicle battery BY is connected to ammeter A. Flasher FL is also connected to the ammeter and has a pilot lamp PL. Brake switch BS is connected to brake or stop lamps LBL and RBL through turn signal switch TS which is also connected to front signal lamps LSL and RSL. Switch TS is of the type arranged to disconnect either brake lamp from switch BS when that brake lamp is being used to signal a turn. If desired, the tail lamp could also be connected through switch TS for the same purpose. Foot switch FS controls the selection of high beams or low beams for the headlamps. While all the lamps are shown as separate units, adjacent lamps may be mounted in a single lamp compartment or may be combined in a dual filament lamp.

Referring to Fig. 4, in the "off" position of switch 15, circuit closer 30A carried by slide 14 is spaced from the switch contacts, circuit closer 30B bridges contacts 20A and 20B, and circuit closer 30C bridges contacts 20C and 20D. In this position of switch 15, turn signal switch TS is connected to flasher FL and brake switch BS is connected to ammeter A. Thus, the turn signal and brake lamps may be operated in the normal manner.

Figure 5:
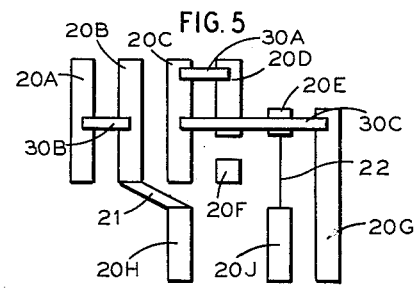

In the "parking lamps on" position of Fig. 5, closer 30A bridges contacts 20C and 20D, closer 30B bridges contacts 20A and 20B, and closer 30C bridges contacts 20C, 20D, 20E and 20G. In this position the parking and tail lamps are on and the brake and turn signals may be operated in the usual manner.

Figure 6:
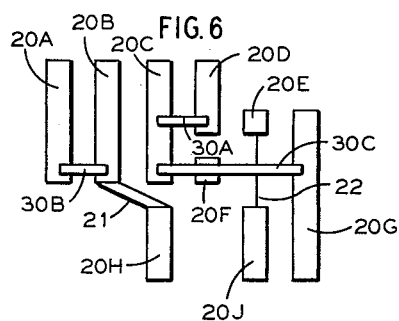
Figure 6:

Fig. 6 illustrates the third or "headlamps on" position. In this position of the switch, closer 30A bridges feed contact 20C and brake switch contact 20D. Closer 30B bridges turn signal switch contact 20A and flasher contact 20B. Closer 30C bridges feed contact 20C, headlamp contact 20F, and tail lamp contact 20G. The headlamps and tail lamps are on, and the turn signal and brake lamps are operable in the normal manner.

Figure 7:
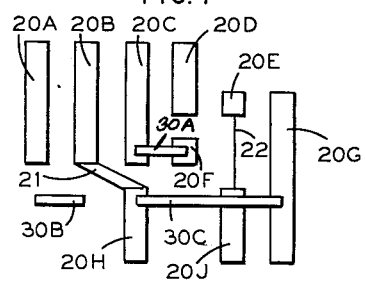

The first "flare" position is illustrated in Fig. 7. In this position, closers 30B and 30C are disengaged from the "normal" lighting and signalling contacts 20A through 20F, and closer 30C is positioned over the "flare" contacts 20G, 20H, 20J. However, closer 30A bridges feed contact 20C and headlamp contact 20F, so that the headlamps are steadily illuminated.

Closer 30C bridges auxiliary flasher contact 20H, auxiliary parking lamp contact 20J, and tail lamp contact 20G. Contact 20H is connected to flasher FL through bridge 21 and flasher contact 20B. Thus, the parking lamps and tail lamps, as well as pilot lamp PL, are flashed in this fourth position of switch 15. It should be noted that a little extra effort is necessary to move slide 15 from the "headlamps on" position due to detent pimple 17 engaging in recess 18 of slide 14.

Figure 8:
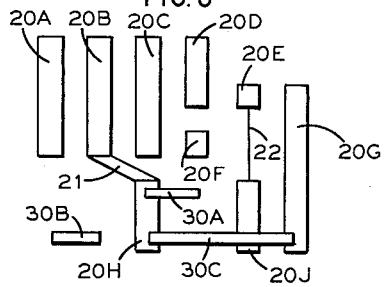

In the second "flare" position, shown in Fig. 8, the parking lamps and tail lamps are still connected to flasher FL and thus flashed, but closer 30A has disengaged headlamp contact 20F so that the headlamps are extinguished.

In both flare positions (Figs. 7 and 8) the stop lamps and turn signal lamps are inoperable due to closer 30A disengaging contacts 20D and closer 30B disengaging contacts 20A and 20B. The license plate and any other auxiliary lamps connected in the tail lamp circuit feed are flashed, but as these lamps are low-power, their current drain on the battery is negligible.

Figure 9:
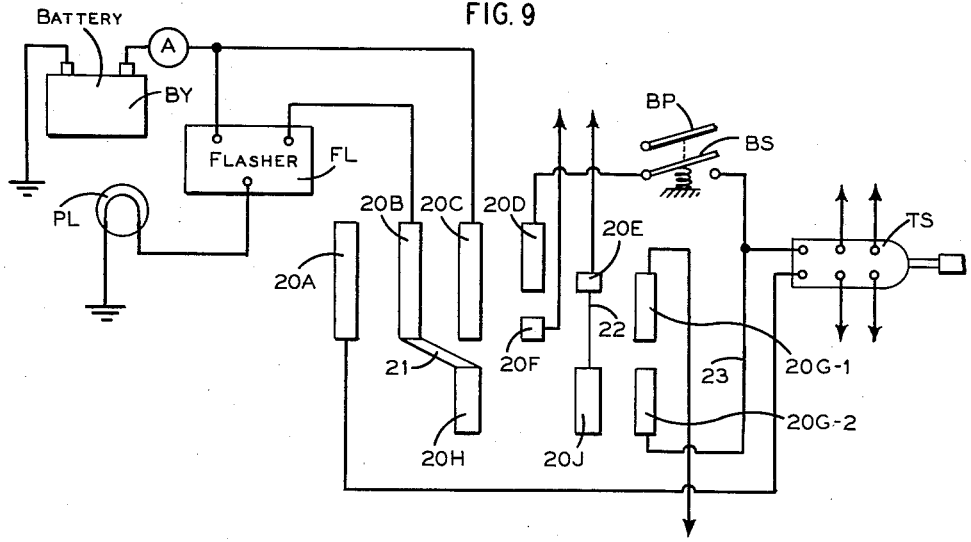
Fig. 9 is a view similar to Fig. 3 of the switch as arranged for use of the stop lamps as "flare" signals.

Fig. 9 illustrates the switch as arranged to use the stop lamps as "flare" signals, only so much of the lamp wiring being included as necessary for an understanding of the modification. The only change from Fig. 3 is that contact 20G of Fig. 3 is divided into two electrically isolated contacts 20G–1 and 20G–2. Contact 20G–1 is connected to the tail lamps whereas a conductor 23 connects contact 20G–2 to the brake switch terminal of turn signal switch TS.

Figs. 10 and 11 illustrate the switch contact arrangement of Fig. 9 in each of the two "flare" positions. In the first "flare" position of Fig. 10, the headlamps are steadily illuminated by closer 30A bridging contacts 20C and 20F. Brake switch BS is disconnected from battery BY by virtue of closer 30A disengaging contact 20D, and turn signal switch TS is disconnected from flasher FL by virtue of circuit closer 30B disengaging contacts 20A and 20B.

Parking lamps LPL and RPL are flashed by virtue of closer 30C bridging auxiliary flasher contact 20H and auxiliary parking lamp contact 20J. The tail lamps are extinguished by closer 30C disengaging contacts 20C and 20G–1. The stop lamps are flashed through contact 20H, circuit closer 30C, contact 20G–2, and conductor 23.

In the second "flare" position, Fig. 11, the flashing connections remain unchanged, but the headlamps are extinguished by contact 30A disengaging headlamps contact 20F.

The arrangements so far described have utilized the usual turn signal flasher for flashing the "flare" signal lamps. In some circumstances, it may be desirable to use a separate flasher, with or without a separate pilot lamp, to flash the "flare" signals. Fig. 12 shows the switch arrangement of Fig. 3 as modified for the use of separate fasteners.

Referring to Fig. 12, the only changes involve removal of bridge connection 21 to isolate flasher contacts 20B and 20H, and connection of a second flasher FL–2, which may have a pilot lamp PL–2, between ammeter A and contact 20H. It will be apparent that the contact arrangement of Fig. 9 can be readily modified in the same manner. In the arrangement of Fig. 12, when the switch is in either "flare" position, flasher FL–1 is inoperative as closer 30B has disengaged contact 20B and the latter is no longer connected to contact 20H which is engaged by closer 30C. Similarly, flasher FL–2, being connected to contact 20H, is operable only in the flare positions of the switch 15.

While switch 15 has been illustrated as a pull-out switch, it will be clear that the contact arrangements of Figs. 3, 9 and 12 can be readily incorporated in a rotary switch having the same five positions.

While specific embodiments of the invention have been shown and described in detail to illustrate the application of the invention principles, it will be understood that the invention may be embodied otherwise without departing from such principles.

What is claimed is:

1. A combined headlamp control and flare signal switch for automotive vehicles, said switch comprising, in combination, a dielectric base member; a dielectric slide member; said members being mounted for relative movement to any one of five positions; one of said members carrying a plurality of electrically conductive contacts arranged along spaced lines parallel to the direction of such relative movement; and the other member carrying a plurality of electrically conductive circuit closers arranged along a pair of spaced lines transverse to the direction of such relative movement to selectively bridge said contacts; said closers including first and second closers arranged in spaced alignment and a third closer in spaced parallel relation to said first and second closers;

said first and third closers having a length such as to bridge only two laterally adjacent contacts, and said second closer having a length such as to bridge four laterally adjacent contacts; said contacts including first and second relatively elongated contacts having a length such that they are bridged by said first closer in the first three positions of said members and disengaged by said first closer in the fourth and fifth positions of said members, a third relatively elongated contact having a length such that it is bridged by said second closer in the first three positions of said members and disengaged by said second closer in the fourth and fifth positions of said members, a fourth relatively elongated contact having a length such that it is bridged by said second closer in the first two positions of said members and disengaged by said second closer in the third, fourth, and fifth positions of said members, a fifth contact having a length such that it is bridged by said second closer only in the second position of said members, a sixth contact having a length such that it is bridged by said second closer only in the third position of said members, a seventh relatively elongated contact having a length such that it is bridged by said second closer in all except the first position of said members, and eighth and ninth relatively elongated contacts having a length such that they are bridged by said second closer only in the fourth and fifth position of said members; said third closer being disengaged from said contacts in the first position of said members, and bridging said third and fourth contacts in the second and third positions of said members.

2. A switch as claimed in claim 1 including means electrically interconnecting said second and eighth contact; said eighth contact being aligned with and spaced from said third contact; and means electrically interconnecting said fifth and ninth contacts; said ninth contact being aligned with, and spaced from said fifth contact.

3. A switch as claimed in claim 1 in which said seventh contact comprises a pair of longitudinally spaced contact sections, one having a length such that it is engaged by said second closer only in the second and third positions of said members and the other having a length such that it is engaged by said second closer only in the fourth and fifth positions of said members.

4. A switch as claimed in claim 1 including detent means releasably restraining movement of said members from the third to the fourth position.

References Cited in the file of this patent

UNITED STATES PATENTS

| 2,171,822 | Zapp et al. | Sept. 5, 1939 |
| 2,656,426 | Dibelka | Oct. 20, 1953 |
| 2,667,627 | Hollins | Jan. 26, 1954 |
| 2,672,531 | Stevenson | Mar. 16, 1954 |
| 2,724,102 | Hollins | Nov. 15, 1955 |
| 2,768,366 | Bertaud | Oct. 23, 1956 |
| 2,771,525 | Sivak | Nov. 20, 1956 |
| 2,787,779 | Hollins | Apr. 2, 1957 |

FOREIGN PATENTS

| 896,446 | France | May 2, 1944 |